July 19, 1949.  E. E. WHICHER  2,476,573
VEHICLE MOUNTED, SWINGABLE BAND-FRAME, LOGGING SAWS
Filed Oct. 30, 1944  2 Sheets-Sheet 1
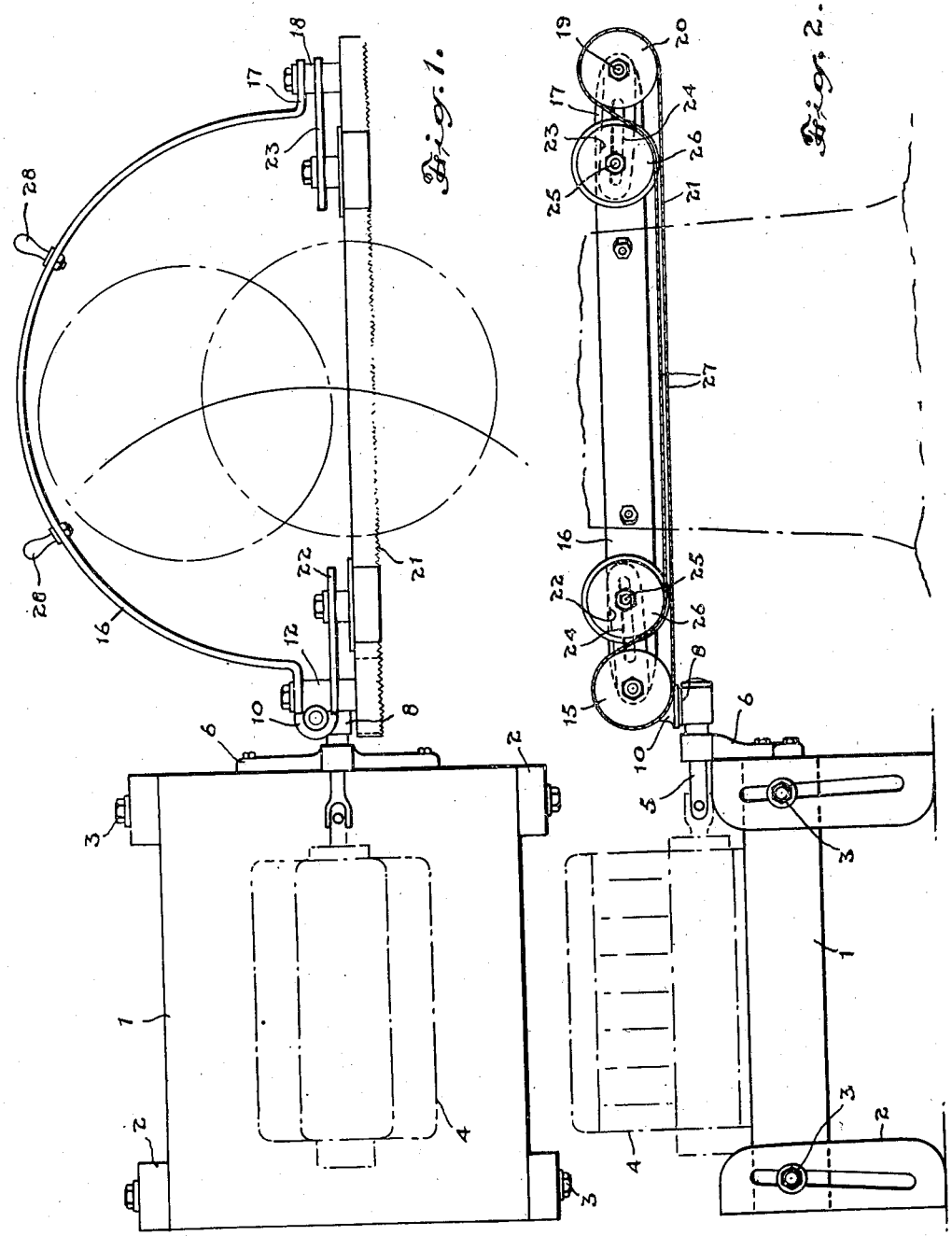
Inventor.
Edmund E. Whicher.

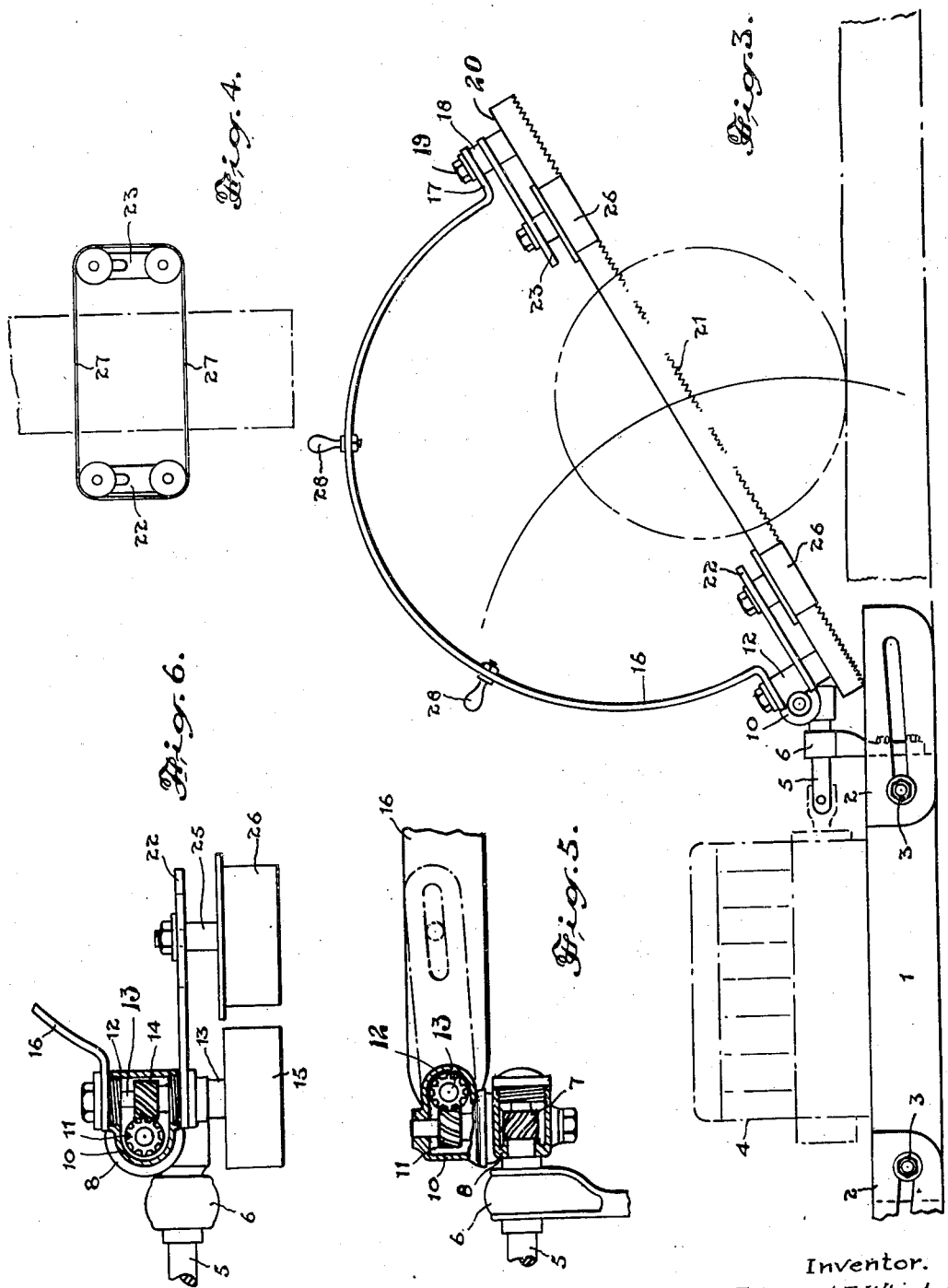

Patented July 19, 1949

2,476,573

UNITED STATES PATENT OFFICE 2,476,573

VEHICLE MOUNTED, SWINGABLE BAND-FRAME LOGGING SAW

Edmund E. Whicher, Hilton Beach, Ontario, Canada

Application October 30, 1944, Serial No. 561,138

3 Claims. (Cl. 143—19)

The invention relates to improvements in logging saws and the principal objects are to provide a power-driven saw which may be operated effectively in the woods for felling trees, cutting logs and also for cutting fuel wood and which will effect a material saving in labour and material.

A further object is to devise a saw which will cut at any angular plane, thus enabling the cutting of trees close to the ground and the cutting of logs or trees square across.

The principal feature of the invention consists in the novel construction and arrangement of a band saw carrier or support mounted upon a universal power-transmitting connection coupled to a power drive whereby the band saw may be utilized to cut trees horizontally or at any desired angle or to cut vertically through felled trees or logs, or to operate at any desired angle.

A further important feature consists in the novel manner of supporting the saw and its operating engine in order to adjust its position relative to the tree or log to be cut.

In the accompanying drawings

Figure 1 is a plan view of my improved logging saw showing the saw arranged for cutting horizontally through a standing tree.

Figure 2 is a side elevational view of the saw shown in Figure 1.

Figure 3 is a side elevational view of the saw showing it in position to operate to make a vertical cut.

Figure 4 is a plan view showing the band saw adjusted for making a double vertical cut through a log for the cutting of firewood.

Figure 5 is an enlarged vertical part sectional elevation of the universal power transmission in a position illustrated in Figure 2.

Figure 6 is an enlarged horizontal plan in part section of the power transmission and saw-carrying members as illustrated in Figure 1.

In the operation of logging in the woods it has been found extremely desirable to provide a power-driven saw for felling trees and cutting logs and fire wood. This invention has been devised to provide a saw which will operate successfully in any desired angular plane so that it will cut horizontally, vertically or obliquely.

In order to accomplish this result I have devised a structure as illustrated in the accompanying drawings and I preferably provide a portable engine base 1 to the corners of which are attached the slotted runners 2 which are adapted to be adjusted in various positions, such as illustrated in Figures 2 and 3, by adjustment of the bolts 3 extending through the slots of the runners.

A suitable power unit 4 is mounted upon the base 1 and the shaft 5 universally connected to the engine is supported in a suitable journal bracket 6 mounted on the engine base.

On the outward end of the shaft 5 is mounted a spiral gear 7 (Figure 5) and enclosing the gear 7 and rotatably mounted on the shaft is a casing 8 which extends laterally to one side of the spiral gear and within which is mounted a spiral gear meshing with the gear 7.

A casing 10 is rotatably mounted on the casing 8 and forms an extension thereof and houses a spiral gear 11. The casing 10 is formed with a lateral extension 12 in which is journalled a spindle 13 on which is mounted a spiral gear 14 meshing with the gear 11. One end of the spindle 13 extends beyond the casing extension 12 and has mounted thereon a pulley 15.

Rigidly secured to the casing extension 12 is a rigid metal bow 16 which is preferably a half circle in form and has a lateral extension 17 on which is mounted a journal bearing 18 parallel with the extension 12. In the bearing 18 is mounted a spindle 19 on which is mounted a pulley 20 corresponding to and in alignment with the pulley 15. A band saw 21 is looped around the pulleys 15 and 20.

Pivotal arms 22 and 23 are mounted respectively on the casing extension 12 and the bearing 18. Each of these arms is formed with a longitudinal slot 24 in which is mounted a spindle 25 carrying a pulley 26 which is preferably flanged. These pulleys 26 are aligned between the pulleys 15 and 20 and engage the band saw to hold the two parallel portions 27 of the saw in close operating relationship, as illustrated in Figure 2, or, spread apart as illustrated in Figure 4.

In both of these arrangements the band saw extends across the open side of the bow frame 16 and the saw, through the spiral gear connections described, is driven by the engine, or other power unit 4 mounted on the base, so that by placing the base in a suitable position close to a tree the bow frame may be swung on its pivot for the saw to be brought into contact with the upstanding tree trunk, as illustrated in Figures 1 and 2.

The fast-rotating band saw with its two parallel cutting edges arranged close together by the adjustment of the arms 22 and 23, cuts a free cut through the tree trunk.

It will be seen that the engine base may rest in a very low-down position, as shown in Figure 3, by the arrangement of the pivotal runners 2 in a horizontal position, or, the runners may be swung to a vertical position and the engine base supported at any desired elevation thereon, as illustrated in Figure 2.

It will be readily understood that the universal connection between the engine shaft and the saw-driving pulley 15 that the saw frame may be swung or rotated on the journal portion of the casing 8 surrounding the spiral gear 7, so that the saw will cut horizontally, obliquely or vertically, and whatever position the saw frame is turned to the frame is free to swing on the upper journal portion toward the tree or log to be cut.

By means of this universal suspension of the saw frame and saw the operator gripping the handles 28 mounted on the saw frame can operate the saw horizontally, swinging it on a vertical axis, or operate it in a vertical plane, swinging it on a horizontal axis, or any angle of cut may be made between the horizontal and the vertical.

In cutting firewood it will be found very convenient to set the two parallel lengths of the band saw apart, as illustrated in Figure 4. These may be set apart a sufficient distance to give a required length of cut wood and the operation of the saw frame to bring the same into contact with a log will make two cuts simultaneously.

With a saw constructed in the manner described the base may be dragged on its runners to a desirable location and quickly set up close to a tree that is to be felled. The saw is then swung horizontally or in an angular plane to cut the tree trunk square across and then immediately following the trimming of the fallen tree the log may be moved toward the saw or the saw moved in relation to the log to cut the log into the desired lengths by simply swinging the saw to operate in a vertical plane.

It will be understood that logging operations with a saw of this kind will be facilitated to the maximum extent.

A saw such as described will be extremely simple to operate and may be handled with great ease and facility in the woods. Any suitable prime mover in the form of an engine or motor where electric power is available may be used.

What I claim as my invention is:

1. A logging saw comprising a prime mover base, a prime mover and shaft mounted on said base, a flexible universal power-transmitting unit rotatably mounted on and supported solely by said shaft, a bow frame pivotally mounted on said universal unit, a pulley mounted on said universal unit and operatively connected therethrough with the prime mover shaft, a pulley mounted on the other end of the bow frame, a continuous band saw extending across the open side of said bow frame between said pulleys and means for gripping said bow frame for urging said saw into cutting relation with a tree to be cut, said frame and band saw being freely and manually rotatable and swingable to operate in any desired plane.

2. A logging saw comprising a base, a prime mover mounted on the base and having a shaft, a gear casing rotatably mounted on and solely supported by the shaft, a spiral gear secured to the prime mover shaft within said casing, a spiral gear journalled in said casing and meshing with the spiral gear on said shaft, a casing rotatably mounted on the aforesaid casing, a pair of intermeshing spiral gears mounted in said second-mentioned casing and meshing with the aforesaid spiral gears, a spindle operatively connected with the latter spiral gear, a pulley mounted on said spindle, a bowed saw frame mounted on said pivotal gear-enclosing casing, a pulley mounted on the outer end of said saw frame, a band saw extending across the open side of said bow frame and around said pulley, means for gripping said bowed frame for urging said saw into cutting relation with a tree to be cut and adjustable guide pulleys slidably and swingably mounted to engage and apply tension to the band saw, said frame and band saw being freely rotatable and swingable to operate in any desired plane.

3. A logging saw comprising a prime mover base having bolt extensions, a shoe having a slot therein extending longitudinally thereof pivotally and slidably mounted on each of said bolt extensions, said shoes being adapted to be adjusted on said bolt extensions to form vertical struts to permit adjustment to raise or lower the position of the base or to be swung horizontally to form runners, a prime mover mounted on the base, a universal power connection pivotally mounted and supported from the prime mover, a saw frame pivotally connected to said universal power connection, pulleys mounted on opposite ends of said saw frame, and a band saw mounted on said pulleys.

EDMUND E. WHICHER.

REFERENCES CITED

The following references are of record in the file of this patent:

UNITED STATES PATENTS

| Number | Name | Date |
|---|---|---|
| 822,056 | Knox | May 29, 1906 |
| 840,366 | Pedley | Jan. 1, 1907 |
| 1,028,992 | Campbell | June 11, 1912 |
| 1,368,777 | Wernicke | Feb. 15, 1921 |
| 1,416,355 | Johnson | May 16, 1922 |
| 1,445,039 | Pribnow | Feb. 13, 1923 |
| 1,798,402 | Dibble | Mar. 31, 1931 |
| 2,354,095 | Adams | July 18, 1944 |

FOREIGN PATENTS

| Number | Country | Date |
|---|---|---|
| 96,798 | Germany | Apr. 16, 1898 |
| 740,718 | France | Nov. 21, 1932 |